United States Patent [19]

Christensen

[11] 4,226,671
[45] Oct. 7, 1980

[54] VENTING OF GASES

[75] Inventor: Don C. Christensen, Bartlesville, Okla.

[73] Assignee: Phillips Petroleum Company, Bartlesville, Okla.

[21] Appl. No.: 718,485

[22] Filed: Aug. 30, 1976

[51] Int. Cl.² .............................................. B01D 1/00
[52] U.S. Cl. ................................ 159/47 R; 159/2 E; 528/501
[58] Field of Search ........................ 159/2 E, 31, 47 R; 425/203, 204, 812; 259/191

[56] References Cited

U.S. PATENT DOCUMENTS

| | | | |
|---|---|---|---|
| 828,524 | 8/1906 | Warren | 159/31 X |
| 2,378,539 | 6/1945 | Dawihl | 159/2 E |
| 3,035,306 | 5/1962 | Rossiter | 18/12 |
| 3,078,512 | 2/1963 | DeHaven | 159/2 E |
| 3,195,178 | 7/1965 | Carton et al. | 259/194 |
| 3,212,133 | 10/1965 | Heidrich | 159/2 E |
| 3,535,737 | 10/1970 | Hendry | 159/2 E |
| 3,667,733 | 6/1972 | Fritsch | 259/6 |
| 3,702,691 | 11/1972 | Fritsch | 259/192 |
| 3,738,409 | 6/1973 | Skidmore | 159/2 E |
| 3,799,234 | 3/1974 | Skidmore | 159/2 E |
| 3,963,558 | 6/1976 | Skidmore | 425/203 |
| 3,985,348 | 10/1976 | Skidmore | 425/203 |

FOREIGN PATENT DOCUMENTS 327998  3/1972  U.S.S.R. ..................................... 425/203

OTHER PUBLICATIONS

Twin Screw Compounding Machines for Plastic Materials (ZSK)—"Werner & Pfleiderer Experience".

*Primary Examiner*—Norman Yudkoff

[57] ABSTRACT

A device for separating, collecting and returning particulate matter and/or mist entrained in gases is mounted across the vent opening. The mid-section of the device is made to communicate with the vent opening and is partially recessed therein resulting in minimum velocity of the gases escaping through either side of the device and reducing particulate build-up between working parts of the device and the vent opening.

1 Claim, 3 Drawing Figures

VENTING OF GASES

BACKGROUND OF THE INVENTION

This invention relates to venting of gases from an apparatus. In particular, it relates to venting of gases which carry with them entrained particulate matter and/or entrained liquid mist.

Gases vented from an apparatus often contain entrained particulate matter and/or entrained liquid mist. The removal and collection of such entrained substances is desirable for several reasons. First, the entrained matter tends to accumulate around the passage restricting the area of the vent opening, necessitating periodic clean-ups which result in additional loss of productivity. Second, the removal and collection prevents pollution, and often eliminates an environmental-, safety- or health-hazard. Finally, the collection of the substance results in recovery of an often valuable product. It is economically preferable to automatically return the collected matter into the apparatus from which it escaped. Various devices have been proposed for collection and automatic return of the collected matter. One such device, used on an extruder vent, comprises a screw rotatably mounted and closely fitting inside a tubular vent passage. The rotating screw allows the gases to pass through, but it traps the entrained matter. The rotational direction and the screw pitch are such that the trapped material is returned into the extruder. In a variation of that concept, instead of a screw a rapidly reciprocating piston or ram is employed to trap the particulate matter and return it to the extruder. Another device, utilizes twin screw arrangement for trapping and returning the collected entrained matter while allowing the gases to pass through.

These devices, however, reduce the available passage area in the vent and thereby increase the velocity of the escaping gases. The increased velocity causes some of the entrained matter to pass through the collecting device. Furthermore, some of the entrained matter deposits in the entrance section of the vent in front of the working parts of the collecting device clogging the passage area.

The present invention obviates the problems encountered in the prior art.

Thus, one object of the invention is to provide an improved apparatus for collecting and returning matter and mist entrained in the gases escaping through a vent.

Another object of the invention is to eliminate environmental-, safety-, and health-hazard by removing entrained matter from gases escaping through a vent.

Still another object of the invention is to provide for removal of entrained matter by means of a device causing minimum increase in velocity of the escaping gases.

A further object of the invention is to provide for removal of entrained matter from gases without causing formation of deposits near the entrance to the vent, in front of working parts of the device for collecting and returning entrained matter.

A still further object of the invention is to prevent economic losses by returning substantially all entrained matter, collected from the escaping gases, to the apparatus.

Still another object of the invention is to return collected matter to the apparatus with minimum delay and without any interruption of the process carried on in the apparatus from which gases are vented.

A still further object of the invention is to provide an improved venting system for an extruder.

Still another object of the invention is to provide a venting system which allows for venting of gases in a uniform and continuous manner.

A still further object of the invention is to provide a venting system for an extruder which allows for collection and return of particulate matter and mist which are entrained in the escaping gases.

Still another object of the invention is to provide a venting system wherein the device for collecting and returning particulate matter and liquid mist entrained in the escaping gases is an only slightly modified commercially available device.

Other objects of the invention will become obvious to one skilled in the art upon reading of this specification and of the appended claims.

SUMMARY OF THE INVENTION

In accordance with one aspect of the invention, a device is provided for collecting and returning matter entrained in gases permitted to escape through a vent.

In accordance with another aspect of the invention, a device for collecting and returning of matter entrained in gases is mounted across the vent to allow escaping gases to flow into its mid-section and out through either end thereof or through multiple ends thereof.

In accordance with a further aspect of the invention, a device is mounted across the apparatus so as to partially fit inside apparatus thereby reducing or eliminating the distance between polymer working screws and parts of the device designed to collect and return collected entrained matter.

In accordance with still another aspect of the invention, the device for collecting and returning matter entrained in gases is mounted across a vent of an extruder in such a manner as to minimize the distance between the extruder working screws and parts of the device designed to collect and return collected entrained matter.

In accordance with a still further aspect of the invention, the device for collecting and returning matter entrained in gases utilizes twin screw arrangement.

In accordance with a still further aspect of the invention, the device provided for collecting and returning polymeric materials entrained in gases escaping through a vent of the extruder is another extruder.

In accordance with still another aspect of the invention, the device provided for collection and returning of polymeric materials entrained in gases has separate parts for collecting and returning entrained material in each end thereof.

In accordance with another aspect of the invention, both the apparatus from which venting takes place and the device for collecting and returning entrained matter have elongated casings, which permit a favorable mounting arrangement.

Still further aspects of the invention will become apparent to those skilled in the art upon studying this disclosure.

DETAILED DESCRIPTION OF THE INVENTION

Figure 1:
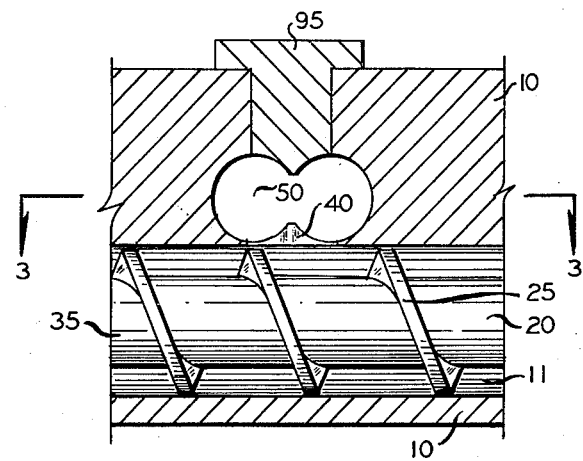
FIG. 1 is a side elevational view of a section of a main extruder; the venting device is omitted from the housing to show the relative configuration.

The present invention provides an improved method and apparatus for collecting and returning matter entrained in gases which are vented. Many devices used for actual collecting and returning of entrained matter are well-known in the art. The U.S. Pat. No. 3,846,193 describes a device which utilizes a helical screw rotatably mounted in a barrel; U.S. Pat. No. 3,799,234 discloses a twin screw arrangement and U.S. Pat. No. 3,535,737 a reciprocating piston arrangement. Any of the prior art devices adapted for collecting entrained matter and returning it into the apparatus from which gases are vented can be used in accordance with some aspects of this invention. Another aspect of the invention provides an improved venting device particularly suitable to use with this invention. Throughout this specification a reference to a "device" shall mean either a device already known in the prior art or the improved device described in the specification.

Of particular significance to this invention is the manner in which device for the collecting and returning matter is arranged with respect to the vent opening. The vented gases must enter the device through its mid-section rather than at its ends. This configuration permits the use of vent cleaning screws of larger diameter than can be accommodated in configuration used in the prior art. Further, this configuration allows for doubling or multiplying of an effective cross-sectional area through which gases can escape. This results in a reduced velocity of the escaping gases when compared with the prior arrangement in which gases enter at the end of the device. The reduced velocity, in turn, allows for not only a more effective collection of the particulate matter, but also for a more uniform and continuous venting of even those gases which are under pressure or even under variable pressure.

Although it is not crucial that the vented gases enter into the device at the center of the mid-section, the entrance opening near the middle of the device is preferred in many applications because such arrangement in a symmetrical device assures similar pressure drop through either side of the device. Consequently, the entering gas is split into at least two approximately equal streams each of which has equal velocity and therefore equal removal rate of entrained matter. In those applications in which it may be desirable to have unequal flows, the entrance to the device should be provided toward one of its ends.

The device can be mounted in any desired manner on the apparatus from which venting occurs; however, if the apparatus and the device are of such shapes and sizes that the device can be positioned with respect to the apparatus in manner so that the imaginary surfaces through the openings of the device and that of the apparatus intersect each other, such positioning is preferable since it results in minimizing the clearance between the polymer working screws and the screws of the vent cleaning device. The most preferable arrangement is one where the axis of the device is parallel to the tangent of the imaginary surface through the opening of the apparatus drawn at the center point of the imaginary surface. It is also preferred to have the device fit inside the apparatus opening as far as possible so that the working parts of the device are near the level of the material processed or contained in the apparatus.

Since the entrance to the venting device is in the mid-section instead of at one of its ends, the application of prior art devices presents a problem—some of the collected entrained matter is not returned into the apparatus directly by the working parts of the device, such as rotating screws. Namely, the entrained matter that enters the leg of the device in which the screw rotates away from the opening is carried away through the end and has to be returned by other means. The preferred embodiment of the present invention; therefore, provides screws which have oppositely pitched flights so as to bring the particulate matter and mist toward the center of the venting device where the vent opening is located. In the alternative there can be provided at least two sets of working screws, each capable of returning the collected matter from the legs of the venting device directly to the apparatus. Although less practical, the invention may also be utilized in connection with a venting device which returns part or all of the collected mist and particulate matter toward at least one end of the device, where it can be collected and reused or suitably disposed of.

Figure 2:
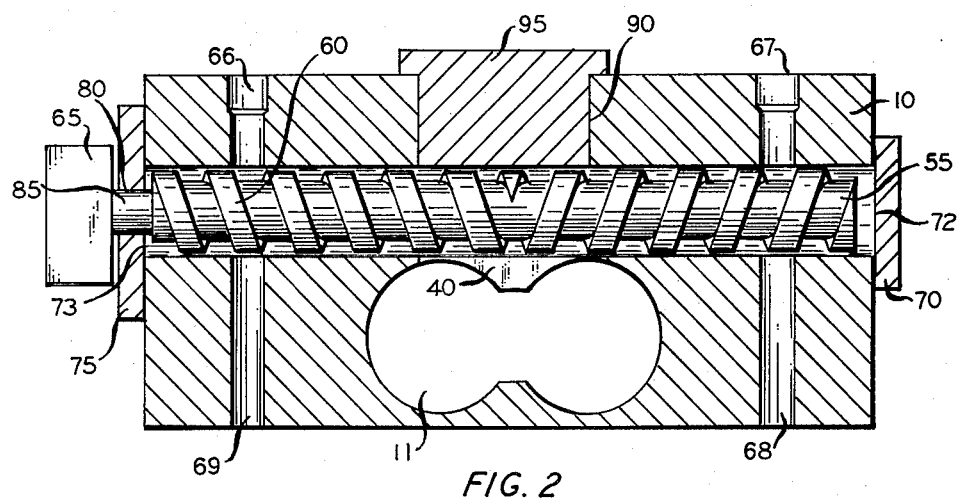
FIG. 2 is a side elevational view of the venting device; the screws of the main extruder are omitted to show the area between main extruder and venting device.
Figure 3:
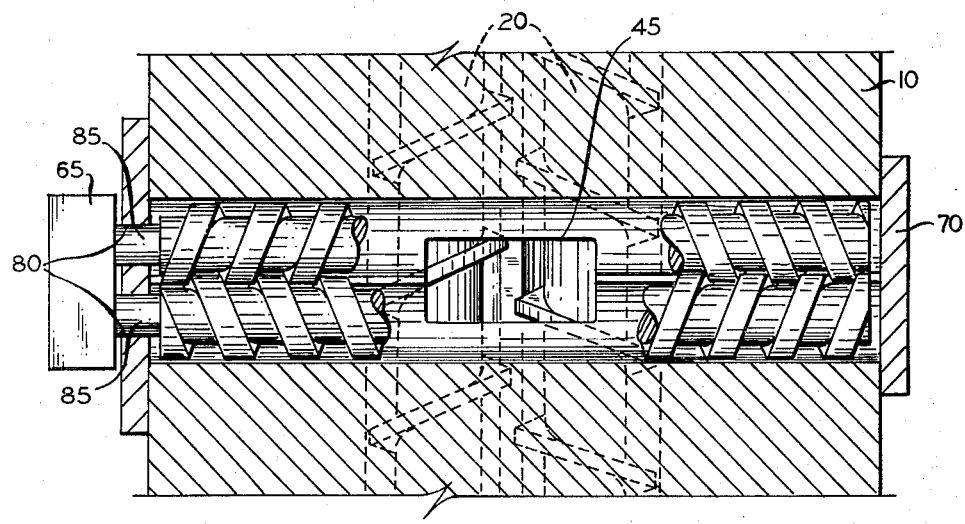
FIG. 3 is a top view taken along 3—3 of FIG. 1 of the venting device mounted across the main extruder, a section of which is shown.

One embodiment of the present invention is illustrated in FIGS. 1, 2 and 3. A section of the main extruder shown therein includes a housing 10 having a bore 11 extending therethrough. A set of twin screws 20, each having helical flights 25 arranged around the stem 35 in such a manner as to advance and compress materials introduced into the bore 11, are rotatably mounted and tightly fitting inside the bore 11. The passageway 40 leading from the bore 11 to a vent opening 45 is adapted to permit gases emanating from materials advanced in the bore 11 to pass into a vent section.

The vent section of the extruder includes a bore 50 extending transversely across the bore 11 and contains rotatably mounted therein twin vent cleaning screws 55. These screws can be interlocking or noninterlocking and either counter- or co-rotating. The helical flights 60 of the vent cleaning screws 55 are pitched in opposite directions on either side of the passageway 40 so that when the vent cleaning screws 55 are rotated by a suitable drive, such as 65, the particulate matter trapped by the vent cleaning screws 55 is advanced toward the passageway 40. The ducts 66, 67, 68 and 69, extending through the housing 10 to the bore 50, allow gases to escape from bore 50 after matter entrained therein is removed. The flow velocity of gases can be regulated by partially or fully closing any number of the ducts 66, 67, 68 and 69.

The bore 50 extends all the way through the housing 10 forming openings 72 and 73 through which twin screws can be conveniently mounted when the apparatus is constructed or when parts thereof are replaced. Removable plates 70 and 75 cover the openings 72 and 73 during the operation, the plate 75 having holes 80 to permit stems 85 of the vent cleaning screws 55 connected to the drive 65 to pass therethrough.

The housing 10 has an accessway 90 above the central portion of the vent cleaning screws 55, which is entirely occupied by a removable plug 95 tightly fitting therein.

In operation, the feed material, such as polymer solution, melt or powder introduced into bore 11 is advanced by the rotating screws 20. The rotating screws 20 are adapted to convey the material in a manner so as to facilitate evolvement of volatiles and other gases. The gases exit from the bore 11 through passageway 40 and the vent opening 45 into bore 50. It should be noted, as shown in FIGS. 2 and 3, that since bore 50 is in close proximity to bore 11 there is practically no area between bore 11 and bore 50 in which the entrained particulate matter can congregate without being returned into the bore 11 by vent cleaning screws 55. The entrained particulate matter and mist are trapped by the flights 60 of the vent cleaning screws 55. The trapped matter is carried by the rotating vent cleaning screws toward the vent opening 45 and upon reaching vent opening 45 the trapped matter is allowed to drop into the bore 11. The gases free of particulate matter and mist exit from the bore 50 via ducts 66, 67, 68 and 69. It should be emphasized that any of these ducts may be partially or totally closed to control the velocity of the escaping gases.

Although a particular preferred embodiment of the invention has been described above for illustrative purposes, it will be recognized that the variations or modifications of such disclosure which lie within the scope of the appended claims are fully contemplated. For example, although the specific embodiment of the invention depicted a vent cleaning device that has been incorporated into the housing of the main extruder it should be noted that existing vent extruders may be merely mounted on the main extruders. Futhermore, multiple vent devices along the barrel of the main extruder may be advantageous in some applications. In some processes it can be desirable or necessary to employ vacuum on either side of the vent device in order to promote drawing gases through the venting device. Also, if a feed extruder is employed in a process the venting device may be utilized on a feed extruder as well as on the main extruder.

EXAMPLE I

A two-inch diameter Welding Engineers twin-screw devolatilizing extruder having counter-rotating, tangential screws was used to devolatilize solution rubbers containing from about 10 to about 30 weight percent of cyclohexane solvent. Two types of rubbers, both random copolymers containing about 75% butadiene and 25% styrene, and made using n-butyl lithium initiator, tetrahydrofuran randomizer, and SnCl$_4$ shortstop, were used in the experiment. The two rubbers differed by the following properties:

|            | Type of Rubber | |
| Properties | 375 | 1204 |
| --- | --- | --- |
| Microstructure: | | |
| Cis, % | 34 | 27 |
| Trans, % | 39 | 43 |
| Vinyl, % | 27 | 30 |
| Inherent Viscosity | 1.89 | 1.90 |
| Oil Content, phr | 37.5 | 0 |
| Base Mooney, ML-4 @ 212° F. | 80 | 20 |
| Final Mooney, ML-4 @ 212° F. | 125 | 56 |

Venting was provided by an 0.8-inch diameter twin-screw Welding Engineers extruder equipped with counter-rotating screws. The venting device was mounted onto the vent at a 90° angle with respect to the extruder and partially fitting inside the barrel of the main extruder. The gas passing into the venting device through an opening in the mid-section was permitted to escape to the atmosphere.

The following data was obtained:

| Run No. | 609 C | 610 D | 611 D | 612 B |
| --- | --- | --- | --- | --- |
| Rubber Type | 375 | 375 | 1204 | 1204 |
| Rubber rate, lb/hr | 126 | 119 | 100 | 112 |
| Solvent Rate from Vent Cleaner, lb/hr | 11 | 15 | 41 | 38 |
| Pressure Below Vent Cleaner, psig | 15 | 25 | — | 15 |

All devolatilized rubber contained less than 0.2 weight percent of the solvent and gases vented to the atmosphere contained substantially no particulate matter or mist.

It is clear from the experiment that a twin screw extruder, having an entrance in the middle of the barrel, placed across and at 90° angle to the devolatilizing extruder in such a manner that it partially fits into the vent opening, can be used for venting gases while returning and collecting entrained solid particulates and mist to the devolatilizing extruder.

EXAMPLE II

The same apparatus as used in Example I was employed to devolatilize a resinous polymodal branched block copolymer containing from about 70 to 95 weight percent of polymerized monovinyl-substituted aromatic hydrocarbon monomer (based on the weight of the total monomers employed), described in detail in U.S. Pat. No. 3,639,517.

The following data was obtained:

| Run No. | D76–415A |
| --- | --- |
| Polymer rate lb/hr | 220 |
| Solvent Rate from vent cleaner lb/hr | 48 |
| Pressure below vent cleaner psig | 2.5 psig |

All devolatilized rubber contained less than 0.2 weight percent of the solvent and gases vented to the atmosphere contained substantially no particulate matter or mist.

This example demonstrates that twin screw extruder having an entrance in the middle of its barrel placed across and at 90° angle to the devolatilizing extruder in such a manner that it partially fits into the vent opening can be used for trapping and returning to the devolatilizing extruder particulate matter and mist entrained in gases. The vent cleaner utilized in the manner described above can efficiently remove entrained particulate matter and mist even from a main extruder having as low a pressure therein as about 2 psig. This fact illustrates one of the advantages of the invention, i.e., that the pressure drop in the vent cleaner of this invention is minimized.

I claim:
1. A method for venting gases containing entrained particulate matter and mist from a container, said method comprising:
  (1) passing said venting gases from a vent opening in said container into an opening in a vent collecting device comprising a casing containing at least one bore, said bore having means for venting gas at its ends and containing at least one screw having pitched flights, said vent collecting device mounted in relation to said vent opening so that venting gases are passed into said bore of the collecting device between the means for venting gas from the bore;

(2) trapping in the flights of said at least one screw the particulate matter and mist entrained in the venting gases; and (3) rotating said at least one screw in a manner to move the trapped particulate matter to a collection point.

* * * * *